United States Patent
Hall

(12) 
(10) Patent No.: US 6,291,099 B1
(45) Date of Patent: *Sep. 18, 2001

(54) BATTERY SYSTEM

(75) Inventor: John C. Hall, Saratoga, CA (US)

(73) Assignee: Space Systems/Loral, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,450

(22) Filed: Jul. 26, 1999

Related U.S. Application Data

(62) Division of application No. 09/018,510, filed on Feb. 4, 1998.

(51) Int. Cl.$^7$ .................................................. H01M 2/02
(52) U.S. Cl. ....................... 429/164; 429/176; 429/177; 429/180
(58) Field of Search .................................. 429/164, 176, 429/177

(56) References Cited

U.S. PATENT DOCUMENTS

| | | |
|---|---|---|
| 4,346,151 | 8/1982 | Uba et al. ............................. 429/54 |
| 4,420,545 | 12/1983 | Meyer et al. ....................... 429/101 |
| 4,828,022 | 5/1989 | Koehler et al. .................... 165/185 |
| 5,096,788 | 3/1992 | Bresin et al. ......................... 429/99 |
| 5,310,141 | 5/1994 | Homer et al. ...................... 244/158 |
| 5,510,208 | 4/1996 | Hall et al. .......................... 429/164 |
| 5,786,107 | 7/1998 | Stafford et al. .................... 429/163 |

FOREIGN PATENT DOCUMENTS

| | | |
|---|---|---|
| 0 449 511 A3 | 10/1991 | (EP) . |
| 0 512 906 A1 | 11/1993 | (EP) . |
| WO 89/00344 | 1/1989 | (WO) . |

OTHER PUBLICATIONS

B.D. Cox "Proceedings of the European Space Power Conference", Oct. 2–6, 1989, Madrid, Spain, Aug. 1989, ESA, Paris, France, Abstract, p. 194, Section 2.3, pp. 193–199.
21$^{st}$ IECEC 1986, San Diego, CA, US vol. 3, pp. 1527–1530, ASC, US: M.J. Mackowski, "A Low Earth Orbit Nickel Hydrogen Battery Design", p. 1527, right hand col., second and third paragraphs, pp. 1528–1529, pp., Fig. 1.

*Primary Examiner*—Maria Nuzzolillo
*Assistant Examiner*—Mark Ruthkosky
(74) *Attorney, Agent, or Firm*—Perman & Green, LLP

(57) ABSTRACT

A battery cell sleeve assembly includes a continuous cylindrical thermal sleeve extending between proximal and distal ends and has a plurality of substantially unidirectional longitudinally extending elongated heat conduction fibers having a thermal conductivity no less than that of aluminum embedded in an adhesive matrix. The thermal sleeve is received on the outer peripheral surface of a cylindrical battery cell and in a contiguous relationship with the battery cell. A cylindrical base member having an annular flange is attached to the thermal sleeve such that the distal ends of the heat conduction fibers are contiguous with the annular flange. With this construction, the annular flange operates as a heat shunt for drawing heat away from the thermal sleeve by conduction between the heat conduction fibers and the annular flange. In one embodiment, the heat conduction fibers are graphite and the thermal sleeve is between about 0.010 and 0.10 inches thick and composed of about 60% fiber and 40% adhesive by volume. An electrically insulative adhesive such as an epoxy with a defined bond line of no less than about 0.005 inches is applied to the interface between the thermal sleeve and the cylindrical base member. After integrating the battery cell and the thermal sleeve, the battery cell is charged. This causes the battery cell to become pressurized which, in turn, radially expands the battery cell such that it becomes more firmly engaged with the thermal sleeve.

6 Claims, 2 Drawing Sheets

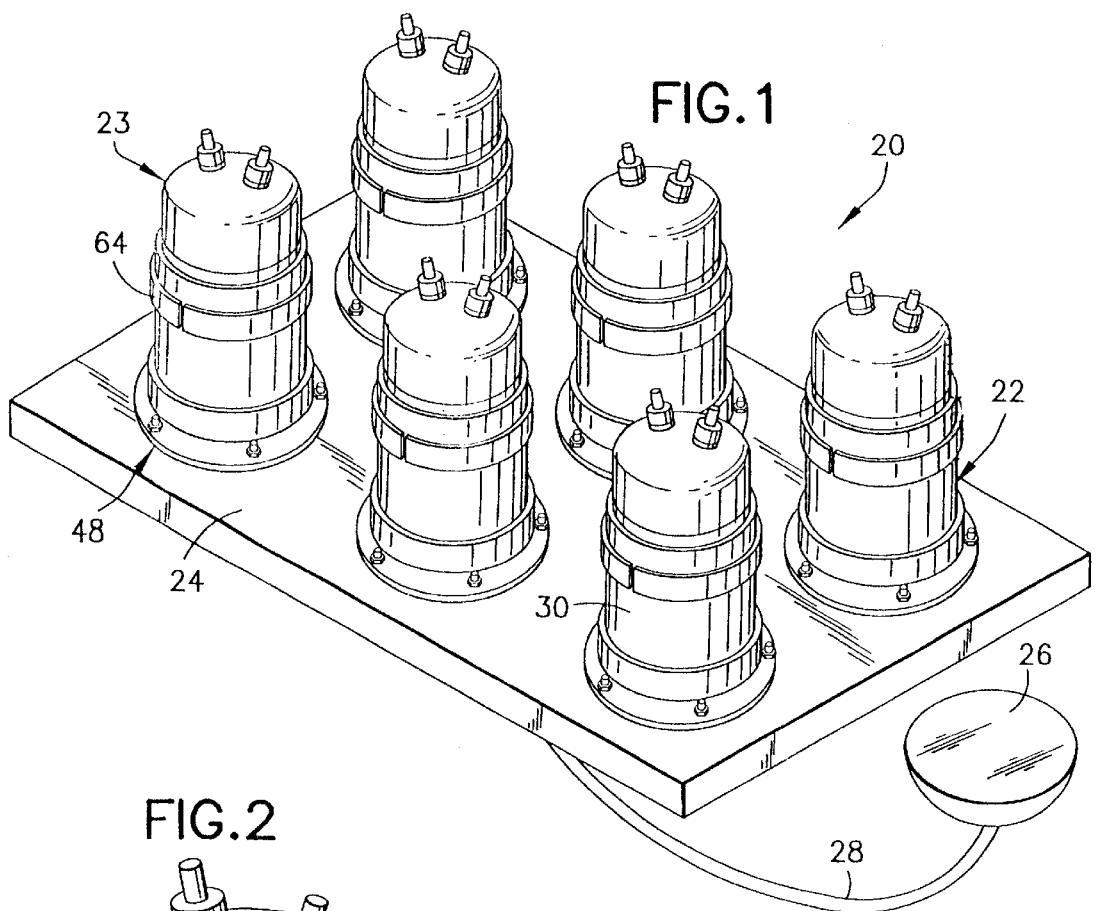
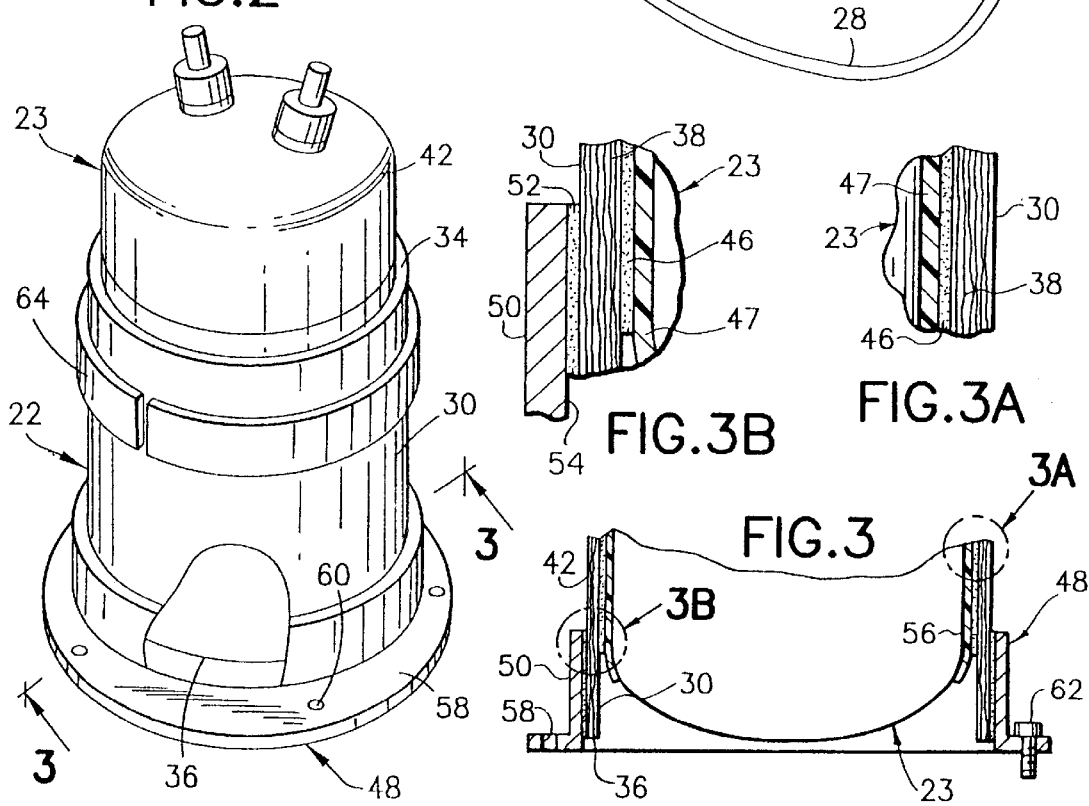

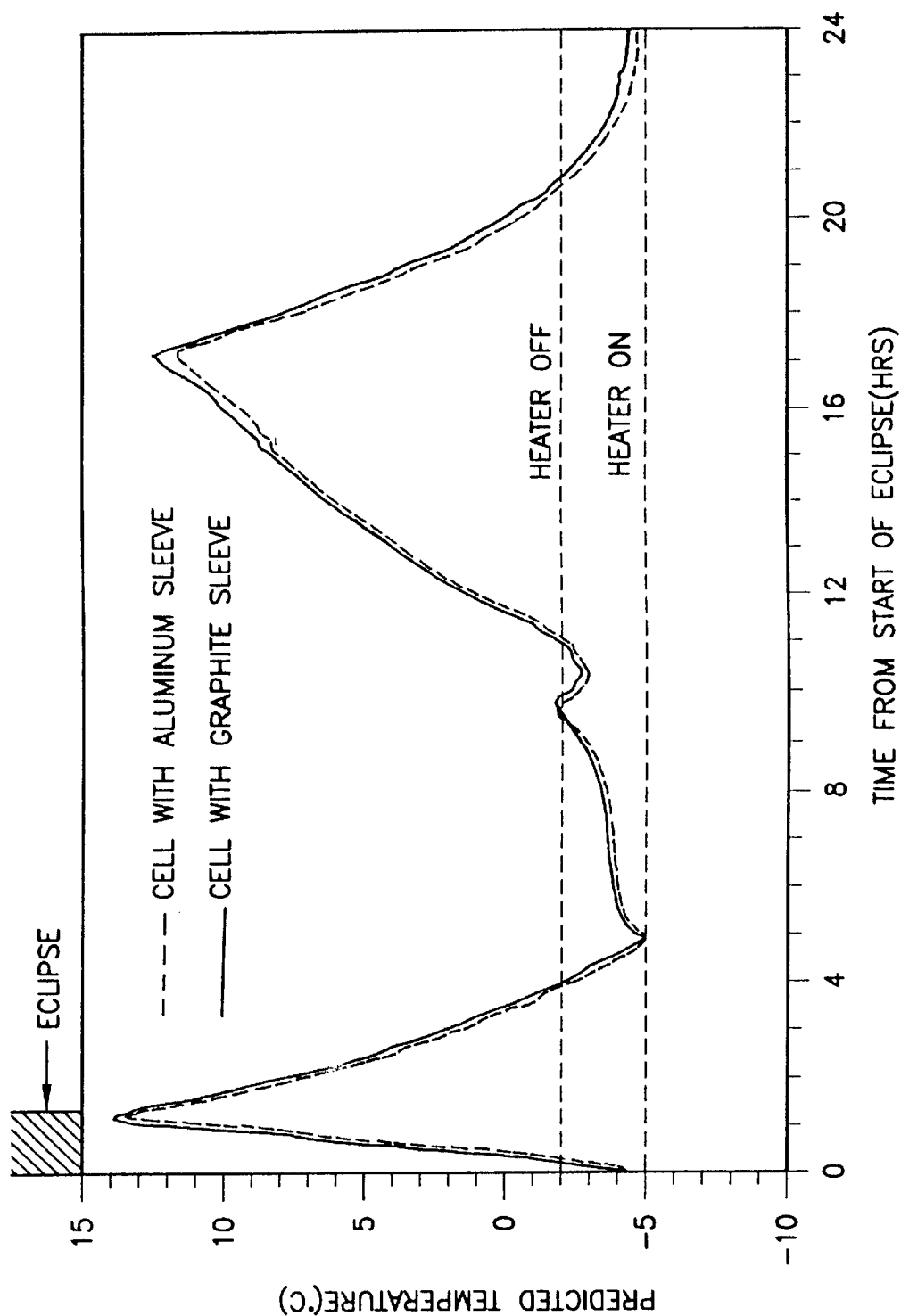

BATTERY SYSTEM

This disclosure is a divisional of application Ser. No. 09/018,510 filed Feb. 4, 1998.

BACKGROUND OF THE INVENTION

1. Field of the Invention

The present invention relates generally to improved systems for mounting batteries on spacecraft to assure their integrity, operability, and long life. Throughout this disclosure, the term "spacecraft" will be used in the generic sense to refer to spacecraft of all types whether they be launch vehicles, space stations, satellites, space probes, or other vehicles operable in a space environment.

2. Description of the Prior Art

Nickel hydrogen batteries for spacecraft are typically mounted into the structure of the spacecraft by means of a plurality of cylindrical metallic sleeves which supportively receive individual cells. The functions of the sleeves are to (a) physically connect each cell to the battery structure and (b) conduct waste heat due to the operation of the cell to the base plate of the battery and thence to the spacecraft heat rejection system (e.g., an optical space radiators.

Numerous metals have been proposed for the fabrication of the battery cell sleeves. These have included aluminum, beryllium, magnesium and alloys of these metals. In actual fact, aluminum is the metal most commonly employed for this purpose. All of these materials meet the technical requirements of having high thermal conductivity, adequate ultimate strength, generally good fracture resistance, and low density. As is common in all space-related activities, weight is a serious consideration in the design and construction of battery cell sleeves such that materials other than metals are continuously being sought which possess all the characteristics noted above while being significantly lighter in weight.

In recent years, composite materials have more and more become materials of choice to replace metals in applications requiring strength and light weight. Composite materials, or "composites", incorporate clusters of elongated fibers of strong materials embedded in a slurry-like amorphous matrix which subsequently solidifies and binds the fibers together into a strong unit.

Graphite is a material which has outstanding thermal conductivity, especially in the pyrrolic form, and low density (~2 g/cm2). Pure graphite, however, is extremely brittle and for this reason, its use as a sleeve material has not previously been seriously considered. An additional non-technical but significant economic impediment to the use of graphite is that it can only be fabricated into formed parts from solid monoblocks by expensive machining.

A number of examples will now be presented which are representative of the prior art generally relating to this area of technology.

U.S. Pat. No. 5,310,141 issued May 10, 1994 to Homer et al. discloses cylindrical battery cells coupled together in plural sets by pairs of half-shell sleeves. The sleeves conduct heat preferentially in an axial direction. Each sleeve set is mounted onto a heat rejection plate for direct radiation to space.

U.S. Pat. No. 5,096,788 issued Mar. 17, 1992 to Bresin et al. discloses a battery pack having a housing and a plurality of cells within the housing, each cell having a positive and negative terminal, and a flex circuit interconnecting the plurality of cells with a biasing appliance providing appropriate contact between the flex circuit and the cell terminals.

U.S. Pat. No. 4,828,022 issued May 9, 1989 to Koehler et al. discloses a heat conducting sleeve designed to fit around a cylindrical heat source such as a battery for use in a satellite. The design is chosen to obtain the optimum tradeoff between heat transfer capability of the sleeve and its weight for a given application.

U.S. Pat. No. 4,420,545 issued Dec. 13, 1983 to Meyer et al. discloses a pressurized metal-gas battery with emphasis upon reducing weight and volume. End plates axially compress the electrode stack and support it radially within the pressure vessel. This reduces stack stress during vibration and cell cycling. The stack is not bonded to the pressure vessel at any point in the battery but is a free unit confined only by the vessel boundary.

U.S. Pat. No. 4,346,151 issued Aug. 24, 1982 to Uba et al. discloses a multicell sealed rechargeable battery including an open mouth monobloc container formed of a plurality of cup-shaped cell holders interconnected at mutual tangent zones, electrochemical cells of the rechargeable type fitting into the cell holders and interconnected to form the battery, and a closure member attached to the mouth of the monobloc container.

The concept of using thermally conductive graphite fibers as a light weight material for a nickel hydrogen cell sleeve is the subject of U.S. Pat. No. 5,510,208 issued Apr. 23, 1996 to Hall et al. In this prior invention, a cylinder of axially oriented graphite epoxy fiber is reinforced on the inner and outer surfaces with square weave structural graphite epoxy laminate and replaces a conventional aluminum part. To provide interface compatibility with the aluminum part, the graphite epoxy part has adhesively attached to it features to clamp the cylinder to the cell and to structurally integrate the cell sleeve assembly so formed with other cell sleeve assemblies. The cylinder is partially slotted in the axial direction to form a key way which provides movement for radial compression.

It was in light of the state of the technology as just discussed that the present invention was conceived and has now been reduced to practice.

SUMMARY OF THE INVENTION

According to the present invention, a battery cell sleeve assembly includes a continuous cylindrical sleeve extending between proximal and distal ends and has a plurality of substantially unidirectional longitudinally extending elongated heat conduction fibers having a thermal conductivity no less than that of aluminum embedded in an epoxy matrix. The sleeve is received on the outer peripheral surface of a cylindrical battery cell and in a contiguous relationship with the battery cell. A cylindrical base member having an annular flange is attached to the continuous cylindrical sleeve such that the distal ends of the heat conduction fibers are contiguous with the annular flange. With this construction, the annular flange operates as a heat shunt for drawing heat away from the continuous cylindrical sleeve by conduction between the heat conduction fibers and the annular flange. In one embodiment, the heat conduction fibers are graphite and the continuous cylindrical sleeve is between about 0.010 and 0.10 inches thick and composed of about (60% fiber and 40% adhesive by volume. An electrically insulative adhesive such as an epoxy with a defined bond line of about 0.005 inches is applied to the interface between the continuous cylindrical sleeve and the cylindrical base member. After integrating the battery cell and the continuous cylindrical sleeve, the battery cell is charged. This causes the battery cell to become pressurized which, in turn, enlarges its outer circumference such that it becomes more firmly engaged with the continuous cylindrical sleeve.

Thus, the present invention reiterates the teachings of U.S. Pat. No. 5,510,208 as to the use of high thermal conductivity, low density graphite fibers as a material for the construction cell sleeves. Graphite fibers have favorable thermal conductivities up to 1100 W/m° K as compared with pyrrolitic graphite (k>2000 W/m° K) and pure aluminum (k=230 W/m° K). In addition, and of even greater importance, unidirectional fiber arrays can be laminated with epoxy binders into thin conformal sheets. Such sheets can, for example, be easily formed into a cylinder suitable for use as a cell sleeve.

In the present invention, however, the following improvements are taught on the graphite epoxy cylinder. In a first instance, rather than attach the slotted cylinder to the cell with mechanical fasteners whose mounting points are bonded to the cylinder, a continuous (unslotted) cylinder is bonded to the unchanged cell with adhesive. The clamping action between the cell and cylinder is achieved additionally by charging the cell which in turn pressurizes the cell and causes its diameter to grow against the inner diameter of the sleeve cylinder. This design modification reduces cost and weight.

Further, because the sleeve cylinder no longer needs to be slotted, the inner layer of square weave structural graphite epoxy laminate may be eliminated. This inner layer was required to prevent buckling with slotted cylinders. However, this component is not required for an unslotted cylinder and, additionally, its other structural functions are met by the cylindrical cell which is now structurally bonded to the inner peripheral surface of the sleeve. This feature reduces cost and weight and slightly improves the thermal performance of the cell sleeve as the inner structural layer of the prior art creates a thermal impedance between the cell source of heat and the social graphite heat removal path.

Additionally, at the juncture between the sleeve cylinder and the lower mounting bracket, the adhesive joint is modified by the use of a filled electrically insulative epoxy with a defined bond line on the order of 0.005 inch. The effect of this construction is to electrically insulate the cell sleeve from the spacecraft. In the prior art, this function is provided by the use of a layer of electrically insulative rubber or plastic film between the cell and the inner peripheral surface of the cylinder. With this new approach, the layer can be deleted, thereby saving weight. Alternatively, if the layer is retained, the cell sleeve assembly is classed as doubly insulated which, in turn, allows deletion of fused grounding between the battery panel and the spacecraft.

Such unidirectional graphite fiber arrays so laminated with an epoxy binder meet the thermal requirements of a cell sleeve assembly for a spacecraft in that they will operate to conduct heat from the electrochemical cell to the spacecraft radiator.

Indeed, the unidirectional thermal layers provide the required conductive properties which heretofore were provided by an isotropic metallic sleeve.

In practice, structures of the invention have been fabricated with AMOCO brand K1100/epoxy thermal layers with the graphite fibers oriented either at 0° or at +/−15° with respect to the longitudinal axis of the cell. Such layers are typically 0.005" thick and composed of 60% fiber and 40% adhesive by volume. The required thermal conductivity is obtained by using sufficient layers factored for their off axis angle.

The need to interface the cell sleeve mechanically and thermally with other cells in the battery and with the spacecraft has been addressed by suitably bonding machined aluminum parts to the heterogeneous graphite epoxy structure described above as required to complete the thermal and mechanical interfaces to the spacecraft. Thus, at the base of the graphite/epoxy cylinder is an overlap bond with a concentric aluminum cylinder which serves as the mechanical and thermal interface to the battery base plate. The overlap is along an axial length of approximately 1" with a bond thickness of between about 0.001" and 0.005". This design assures a sound mechanical interface and a low heat flux across the low thermal conductivity bond joint.

Also, aluminum mechanical features may be bonded to the outer peripheral surface of the continuous sleeve for mechanically joining the cell to adjacent cells for improved mechanical competence.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numbers refer to like parts throughout the disclosure.

BRIEF DESCRIPTION OF THE DRAWINGS

FIG. 1 is a perspective view diagrammatically illustrating for a spacecraft a battery system embodying the present invention;

FIG. 2 is a perspective view of a single battery cell sleeve assembly embodying the present invention and utilized in the battery system illustrated in FIG. 1;

FIG. 3 is a cross section view, taken generally along line 3—3 in FIG. 2, depicting, in greater detail, a part of the battery cell sleeve assembly illustrated in FIG. 2;

FIG. 3A is a detail cross section view illustrating in greater detail a portion of FIG. 3;

FIG. 3B is a detail cross section view illustrating in greater detail another portion of FIG. 3; and FIG. 4 is a graph comparing the performance of the graphite/epoxy construction of the battery cell sleeve assembly of the invention with the prior art aluminum construction.

DETAILED DESCRIPTION OF THE PREFERRED EMBODIMENT

Turn now to the drawings and, initially, to FIG. 1 which diagrammatically illustrates a battery system 20 for use in a spacecraft and embodying the concepts of the present invention. A plurality of battery cell sleeve assemblies 22 are mounted in a manner to be described to a base plate 24 which may be of aluminum honeycomb, for example. The base plate 24 serves as a gross heat shunt for drawing heat away from each of the sleeve assemblies 22. In turn, heat is withdrawn from the base plate 24 and delivered to a suitable optical space radiator 26 via a suitable heat transfer member 28, also diagrammatically shown. The optical space radiator is positioned on the side opposite the honeycomb panel of the base plate and faces deep space, that is, a low temperature sink.

The design features of the battery cell sleeve assemblies 22 which embody the invention are more clearly demonstrated in FIGS. 2, 3, and 3A. FIG. 2 depicts a typical graphite/epoxy sleeve assembly 22 intended for a 3.5" diameter battery cell 23, typically cylindrical with opposed domed ends. It serves to replace an aluminum (prior art) sleeve intended for the same battery cell. The graphite/epoxy sleeve assembly of the invention may weigh 165 g, for example, whereas the aluminum prior art sleeve assembly weighs 325 g. As shown in FIG. 4, the two sleeve assemblies demonstrate equivalent thermal performance. In this regard, each battery cell assembly 22 may be provided with a suitable heater 64 mounted on and overlying the outer peripheral surface of the thermal sleeve 30.

The actual construction of the sleeve assembly 22 will now be described with particular reference to FIGS. 2, 3, and 3A. The thermal sleeve 30 extends between proximal and distal ends 34, 36 of the sleeve assembly 22 and has a plurality of first substantially unidirectional longitudinally extending elongated fibers 38 of high conductivity, low density, material embedded in an adhesive matrix 40. Aluminum is the desirable yardstick for the physical characteristics of the sleeve assembly. That is, the fibers 38 are chosen such that the sleeve assembly 22 will have a thermal conductivity equal to a sleeve fabricated of aluminum and a weight substantially less than one of aluminum. The fibers are preferably graphite, a commercially available example of the fibers being AMOCO brand K1100 with the graphite fibers oriented either at 0° or at +/−15° with respect to the longitudinal axis of the cell. Such layers are typically 0.005" thick and composed of 60% fiber and 40% epoxy by volume. The required thermal conductivity may be obtained by using sufficient layers factored for their off axis angle.

The thermal sleeve 30 is between about 0.010 and 0.10 inches thick and is received in a contiguous relationship on the outer peripheral surface 42 of the cylindrical battery cell 23. Adhesive 46 (FIG. 3A) or other suitable bonding medium is interposed between the thermal sleeve 30 and the outer surface 42 for fixedly joining those components in the relationship illustrated in FIG. 2. It may be desirable for some applications that a layer 47 of suitable insulation in the form of a heat shrinkable film overlie the outer peripheral surface 42 of the cylindrical battery cell 23. In this instance, as illustrated in FIG. 3A, it would be required that the adhesive 46 actually overlie the insulative layer 47.

Turning now to FIGS. 2, 3, and 3B, a cylindrical base member 48, still likely of aluminum, has an upstanding annular flange 50 for reception thereto of the distal end 36 of the thermal sleeve 30. As seen in FIG. 3B, a suitable adhesive 52 is employed to bond the outer surface of the thermal sleeve 30 to the inner peripheral surface 54 of the upstanding annular flange 50 of the base member 48. The adhesive 52 preferably includes a filled electrically insulative epoxy with a defined bond line which is no less than about 0.005 inch. In this manner, the thermal sleeve 30 is assured of being electrically insulated from the spacecraft. The lower outside surface of the thermal sleeve 30 is contiguous with the inner peripheral surface 54 of the upstanding annular flange 50 of the base member 48. With this construction, the thermal fibers 38 are contiguous with the upstanding annular flange 50 such that the upstanding annular flange operates as a heat shunt for drawing heat away from the thermal sleeve by conduction between the fibers 38 and the upstanding annular flange.

Considered as a unit, and viewing especially FIG. 3, the sleeve assembly 22 defines a cylindrical shaped recess 56 for reception therein of the battery cell 23.

The base member 48 also includes an outer annular flange 58 (FIG. 3) which is suitably pierced, as at 60, at a plurality of equally spaced circumferential locations to receive threaded fasteners 62 to mount it securely on the base plate 24.

The graphite/epoxy/aluminum base sleeve assembly 22 has the further advantage over the prior art all-aluminum sleeves in that it is intrinsically double insulated since the aluminum is hard anodized and the surface of the thermal sleeve 30 is pure adhesive. This affords additional electrical fault protection.

While a preferred embodiment of the invention has been disclosed in detail, it should be understood by those skilled in the art that various other modifications may be made to the illustrated embodiments without departing from the scope of the invention as described in the specification and defined in the appended claims.

What is claimed is:

1. A battery system comprising:

a plurality of battery cell sleeve assemblies mounted on a base plate, said base plate being a gross heat shunt for drawing heat away from each of said battery cell sleeve assemblies; and a space radiator thermally connected to said base plate for radiating heat away therefrom to deep space;

wherein each of said battery cell sleeve assemblies includes:

a continuous cylindrical thermal sleeve extending between proximal and distal ends and having a longitudinal axis comprised of a plurality of substantially unidirectional longitudinally extending elongated heat conduction fibers being embedded in an adhesive matrix, said thermal sleeve being received on the outer peripheral surface of a cylindrical battery cell in a contiguous relationship thereto;

a cylindrical base member having an upstanding annular flange for reception thereon of said distal end of said thermal sleeve, said distal end of said thermal sleeve being contiguous with said upstanding annular flange whereby said upstanding annular flange operates as a heat shunt for drawing heat away from said thermal sleeve by conduction between said heat conduction fibers and said upstanding annular flange.

2. A battery cell sleeve assembly as set forth in claim 1 wherein said heat conduction fibers have a thermal conductivity no less than that of aluminum.

3. A battery cell sleeve assembly as set forth in claim 1 wherein said heat conduction fibers are graphite; and wherein said thermal sleeve is between about 0.010 and 0.10 inches thick and composed of about 60% fiber and 40% adhesive by volume.

4. A battery cell sleeve assembly as set forth in claim 1 including:

bonding means for fixedly joining said thermal sleeve to the outer peripheral surface of the battery member.

5. A battery cell sleeve assembly as set forth in claim 1 including:

bonding means for fixedly joining said thermal sleeve to said base member.

6. A battery cell sleeve assembly as set forth in claim 5 wherein said bonding means includes a filled electrically insulative adhesive with a defined bond line no less than about 0.005 inch.

* * * * *